(12) United States Patent
Fukumura

(10) Patent No.: US 7,821,394 B2
(45) Date of Patent: Oct. 26, 2010

(54) PENETRATION DETECTING APPARATUS

(75) Inventor: Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 291 days.

(21) Appl. No.: 12/186,046

(22) Filed: Aug. 5, 2008

(65) Prior Publication Data

US 2009/0058642 A1 Mar. 5, 2009

(30) Foreign Application Priority Data

Sep. 5, 2007 (JP) .............................. 2007-230352

(51) Int. Cl.
*G08B 13/18* (2006.01)
*G06M 7/00* (2006.01)
(52) U.S. Cl. ...................... 340/556; 340/541; 340/565; 250/221
(58) Field of Classification Search ................. 340/550, 340/600, 540, 541, 552–561, 565, 567; 250/221, 250/559.12, 574, 494.1, 495.1, DIG. 1
See application file for complete search history.

(56) References Cited

U.S. PATENT DOCUMENTS

| | | | | | |
|---|---|---|---|---|---|
| 5,015,840 | A | * | 5/1991 | Blau ......................... | 250/221 |
| 5,198,661 | A | * | 3/1993 | Anderson et al. ........... | 250/221 |
| 5,880,954 | A | * | 3/1999 | Thomson et al. ............. | 700/79 |
| 6,354,716 | B1 | * | 3/2002 | Chen et al. .................. | 362/268 |
| 6,791,074 | B2 | * | 9/2004 | Hahn et al. ................. | 250/221 |
| 6,856,862 | B1 | * | 2/2005 | Feltner ....................... | 700/245 |
| 6,958,465 | B2 | * | 10/2005 | Haberer et al. .............. | 250/221 |
| 7,329,854 | B2 | * | 2/2008 | Clifton et al. ............... | 250/221 |
| 2003/0141975 | A1 | | 7/2003 | Hama et al. | |
| 2003/0146373 | A1 | | 8/2003 | Kudo et al. | |
| 2003/0164447 | A1 | | 9/2003 | Kudo et al. | |
| 2005/0063114 | A1 | | 3/2005 | Suhara et al. | |
| 2006/0259837 | A1 | | 11/2006 | Teranishi et al. | |
| 2008/0179504 | A1 | | 7/2008 | Inoue et al. | |
| 2008/0179505 | A1 | | 7/2008 | Inoue et al. | |

FOREIGN PATENT DOCUMENTS

| | | |
|---|---|---|
| JP | 2003-218679 | 7/2003 |
| JP | 2004-356407 | 12/2004 |
| JP | 2006-308499 | 11/2006 |
| JP | 2006-317237 | 11/2006 |
| JP | 2006-317238 | 11/2006 |
| JP | 2007-235408 | 9/2007 |

* cited by examiner

*Primary Examiner*—Toan N Pham
(74) *Attorney, Agent, or Firm*—Kilyk & Bowersox, P.L.L.C.

(57) ABSTRACT

The present invention provides a penetration detecting apparatus which is applicable for various kinds of applications. Although an interval between processing machines and the conveying of an object W is suspended to wait for processing, a muting function of the penetration detecting apparatus is effective. Another feature of the present invention is to provide a penetration detecting apparatus which can avoid the muting function continuously being activated when a trigger sensor for initiating the muting function is malfunctioning. According to the present invention, there is provided a penetration detecting apparatus having a muting function that has a muting terminator for terminating the activated muting function based on the comparison performed by the muting timer and a signal representing a passage of the object provided from a passage sensor when the differential time is within the predetermined criterion, and for terminating the activated muting function based on a signal representing a passage of the object provided from a passage sensor when the differential time is not within the predetermined criterion.

10 Claims, 9 Drawing Sheets

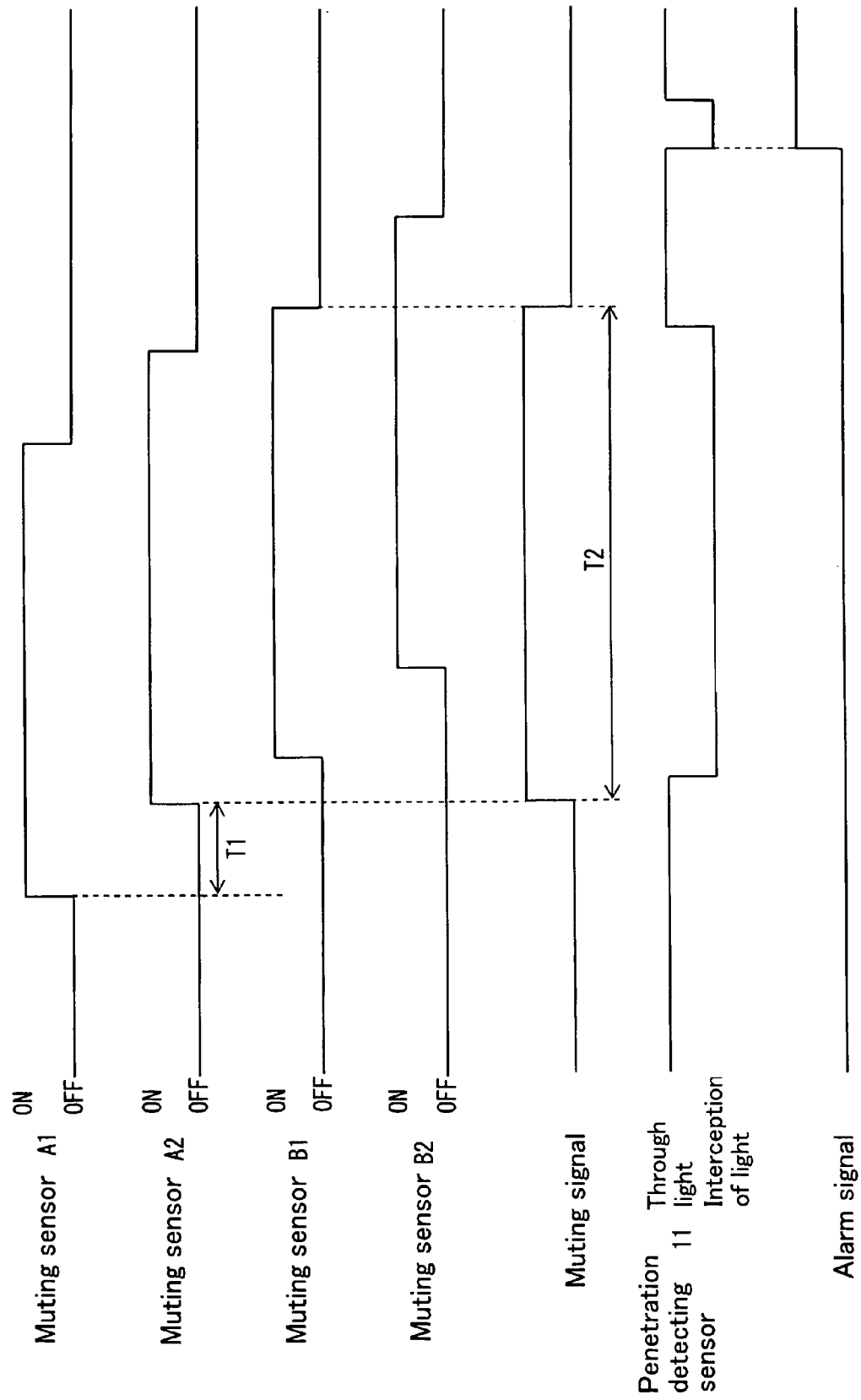

PENETRATION DETECTING APPARATUS

CROSS-REFERENCE TO RELATED APPLICATION

The present application claims priority from Japanese Patent Application No. 2007-230352, filed on Sep. 5, 2007, the entire contents of which are hereby incorporated by reference.

BACKGROUND OF THE INVENTION

1. Field of the Invention

The present invention relates to a penetration detecting apparatus, and particular, the present invention relates to an improvement of a penetration detecting apparatus having a muting function for temporarily suspending the detecting operation of the penetration detecting apparatus.

2. Description of Related Art

Some penetration detecting apparatus detect the penetration of objects toward a forbidden area so as to stop a hazardous apparatus located at the forbidden area, and includes a multi-axis photoelectric penetration detecting apparatus. The multi-axis photoelectric penetration detecting apparatus comprises an emitting unit including a plurality of emitting elements, a receiving unit including a plurality of receiving elements corresponding to the plurality of emitting elements, and a penetration detecting unit for detecting a penetration into the forbidden area based on signals provided from the plurality of the receiving elements. The emitting unit and the receiving unit face each other so that the plurality of emitting elements and the plurality of receiving elements create a plurality of detecting optical axes, namely a light curtain. The penetration detecting unit detects interruption of any one or more detecting optical axes so as to detect the penetration of a person and the like toward the forbidden area.

The emitting units and the receiving units can be disposed on an entrance where objects enter to be processed in a processing machine and can be disposed at the exit as the processed object exits from the processing machine so as to avoid a person accidentally entering into a hazardous area around the processing machine through the entrance or the exit. In this case, however, the processing machine stops at every object to be processed entering or every processed object exiting. Therefore, the multi-axis photoelectric penetration apparatus has a muting function for suspending an object detection temporarily so as to allow the object to be processed through the entrance or the processed object to exit without stopping of the processing machine (referring to Japanese Laid-Open Patent No. 2003-218679). For example, in the case where an object is fed on a conveyer, the muting function is carried out with two additional photoelectric sensors disposed at an upper position on a conveying path than the emitting unit and the receiving unit of the multi-axis photoelectric sensor.

FIG. 9 is a perspective view showing a conveying system including a conventional multi-axis photoelectric penetration detecting apparatus. The conveying system comprises a conveyer V for conveying an object W, and a multi-axes photoelectric penetration detecting apparatus. The multi-axis photoelectric penetration apparatus includes a penetration detecting sensor having an emitting unit 1 and a receiving unit 2 located at an entrance for a processing machine which processes objects W. The objects W are conveyed along a predetermined direction on a conveyer V so as to be processed by the processing machine.

The emitting unit 1 is a light source apparatus including a plurality of emitting elements, such as LED (Light Emitting Diode), and the plurality of emitting elements are arranged in the light source apparatus. The receiving unit 2 is a photoelectric transducer apparatus including a plurality of receiving elements, such as PD (Photo Diode), and the plurality of receiving elements are arranged in the photoelectric transducer apparatus so as to receive light emitted from the plurality of emitting elements respectively. In this case, each of the plurality of emitting elements in the emitting unit 1 is arranged in a line, and each of the plurality of receiving elements in the receiving unit 2 is also arranged in a line.

some penetration sensors include the emitting unit 1 and the receiving unit 2, and are photoelectric sensors including the receiving unit 2 which receives light from the emitting unit 1 directly, namely thru-beam photoelectric sensor. In such a case, at both sides of the conveyer V, the emitting unit 1 and the receiving unit 2 face with each other. The emitting elements and the receiving elements in the photoelectric sensor are arranged on a direction perpendicular to the horizontal plane.

The penetration detecting apparatus can be used to detect a penetration of objects toward a forbidden area to stop an apparatus located at the forbidden area, and can be used to detect the objects passing through an entrance by sensing an interruption of the light, namely a light curtain. In this case, the forbidden area is defined by an area which is located at a lower side of the penetration detecting sensor along the conveying path, and which is surrounded by a protective cage C.

As shown in FIG. 9, sensors A1, A2, B1 and B2 are muting sensors for optically detecting the objects and for providing an outputting signal to the penetration detecting sensor so as to initiate and/or terminate a muting function of the penetration detection. In more detail, the outputting signals of the muting sensors A1 and A2 are provided so that the penetration detecting sensor determines whether the muting function would be activated or not. Thus, the muting sensors A1 and A2 are located at the upper side of the penetration sensor along the conveying path. Moreover, the muting sensor A1 is located more upstream along the conveying path than the muting sensor A2. Therefore, the muting sensor A1 can detect objects W more upstream than the muting sensor A2.

The muting sensors B1 and B2 are located at the lower side of the penetration detecting sensor along the conveying path. In more detail, the muting sensor B1 is located more upstream than the muting sensor B2, and is utilized as a passage sensor for detecting the passage of the objects through the penetration detecting sensor.

In the case where a conveying direction is reversed, the outputting signals of the muting sensors B1 and B2 are provided instead of the outputting signals of the muting sensor A1 and A2 so that the penetration detecting sensor determines whether the muting function would be activated or not. The muting sensor A2 is located at a closer position to the penetration detecting sensor than the muting sensor A1. Thus, the muting sensor A2 is utilized as the passage sensor instead of the muting sensor B2. Each of the muting sensors A1, A2, B1 and B2 comprises an emitting unit for emitting light and a receiving unit for receiving the light from the emitting unit and is a thru-beam photoelectric sensor in which the receiving unit receives the light from the emitting unit directly. The emitting unit and the receiving unit of each of the muting sensors A1, A2, B1 and B2 face with each other and are located at both sides of the conveyer V.

The muting sensors A1, A2, B1 and B2 change an absent detecting status to a present detecting status by detecting a light interruption due to the object W which passes between the emitting unit and the receiving unit of the muting sensor as it travels on the conveyer. The passage of the object W between the emitting unit and the receiving unit of the penetration detecting sensor is detected based on the changing from the present detecting status to the absent detecting status in the muting sensor B1.

The penetration detecting apparatus compares differential time from (a) time at which the photoelectric sensor A1 turns to the present detecting status to (b) time at which the photoelectric sensor A2 turns to the present detecting status with a predetermined time range. When the differential time meets within the predetermined time range, the muting function is initiated. While the muting function is activated, an alarm signal to stop a hazardous apparatus located in the forbidden area, is not activated even if the passage of objects is detected through the penetration detection sensor.

In the above multi-axes photoelectric penetration detecting apparatus, the muting function is not initiated except when the differential time from (a) the time at which the upper muting sensor A1 turns to the present detecting status to (b) the time at which the lower muting sensor A2 turns to the present detecting status, meets within the predetermined time range. In some cases, the muting function is not initiated although the muting function should be initiated. For example, in the case where an object W waits to be processed at a position between the photoelectric sensors A1 and A2 due to a narrow interval between processing machines arranged along a conveying path, the differential time from (a) the time at which the photoelectric sensor A1 turns to the present detecting status to (b) the time at which the photoelectric sensor A2 turns on the present detecting status, does not meet within the predetermined time range. Consequently, the muting function is not initiated.

To solve the above mentioned problem, the muting function may be set to be initiated when both muting sensors A1, A2 turn to the present detecting status in order along the conveying path. In this case, the muting function is initiated regardless of meeting the differential time from within the predetermined time range. In such a case, a target object W and an object without the target object W can be distinguished if a conveying velocity is constant, and, the muting function can be initiated based on the distinction when the target object W is passed. However, the above setting has the following problem. In the case where the photoelectric sensor A1 turns the present detecting status all the time due to a failure of the photoelectric sensor A1 or a shifting position of an optical axis of the photoelectric sensor A1, the muting function is initiated only when the muting sensor A2 turns to the present detecting status.

In general, the muting function is terminated not only when the photoelectric sensor B1 is located at the lower side of a penetration detecting sensor and detects a passage of an object, but also when muting on a continuous time, which is started up from initiating the muting function, in excess of a predetermined period even if the photoelectric sensor B1 does not detect a passage of an object. In some cases, the termination based upon the muting continuation time causes troubles. For example, in the case where conveying of an object W is temporarily suspended so that maintenance of a processing machine can occur, a muting function is likely to be terminated even though maintenance is still occurring on the processing machine. To solve this problem, a penetration detecting sensor having a muting function which is not terminated until the photoelectric sensor B1 detects a passage of an object regardless of a routing continuous time, may be provided. However, although a muting function is initiated only when the photoelectric sensor A2 turns to the present detecting status in the case where the photoelectric sensor A1 continuously provides a signal representing the detection status due to the failure of the photoelectric sensor A1 or accidental shift of an optical axis of the photoelectric sensor A1, the muting function continues to be activated until the photoelectric sensor B1 detects an object.

SUMMARY OF THE INVENTION

The above-mentioned problems associated with the prior art penetration detecting sensors are believed to be solved by the present invention. A purpose of the present invention is to provide a penetration detecting apparatus which is applicable for various kinds of applications. Especially, although an interval between processing machines and the conveying of an object W is suspended so as to wait for processing, a muting function of the penetration detecting apparatus is effective. Another feature according to the present invention is to provide a penetration detecting apparatus which can avoid the muting function from being continuously activated when a trigger sensor for initiating the muting function is malfunctioning.

According to the present invention, there is provided a penetration detecting apparatus having a muting function, that has a penetration detecting sensor for performing a detection of an object at a predetermined detection area; an alarm unit for providing an alarm signal based on a result of the detection performed by the penetration detection sensor when the muting function is not activated; a signal receiver for receiving a first detection signal representing either a detection status or a absent detecting status of the object from a first sensor and a second detection signal representing either a detection status or an absent detecting status of the object from a second sensor; a muting starter for activating the muting function at the time of shifting of the second detection signal from the absent detecting status to the detection status after the first detection signal is shifted from the absent detecting status to the detection status; a muting timer for performing a comparison for a continuous time during the time that the muting function activated with a predetermined period; a time differential watcher for recognizing a differential time between the time of shifting of the first detection signal from the absent detecting status to the detection status and the time of shifting of the second detection signal from the absent detecting status to the detection status, and for determining whether the differential time meets in a predetermined criterion; and a muting terminator for terminating the activated muting function based on the comparison performed by the muting timer and a signal representing a passage of the object provided from a passage sensor when the differential time meets the predetermined criterion, and for terminating the activated muting function based on a signal representing a passage of the object provided from a passage sensor when the differential time does not meet the predetermined criterion.

BRIEF DESCRIPTION OF THE DRAWINGS

The foregoing and other objects and feature of the present invention will be clearly understood from the following detailed description when reading with reference to the accompanying drawings in which:

FIG. 5 shows a time chart during passage of the object W through a penetration detecting sensor 11 along a conveying path;

DETAILED DESCRIPTION OF THE PREFERRED EMBODIMENTS

Figure 1:
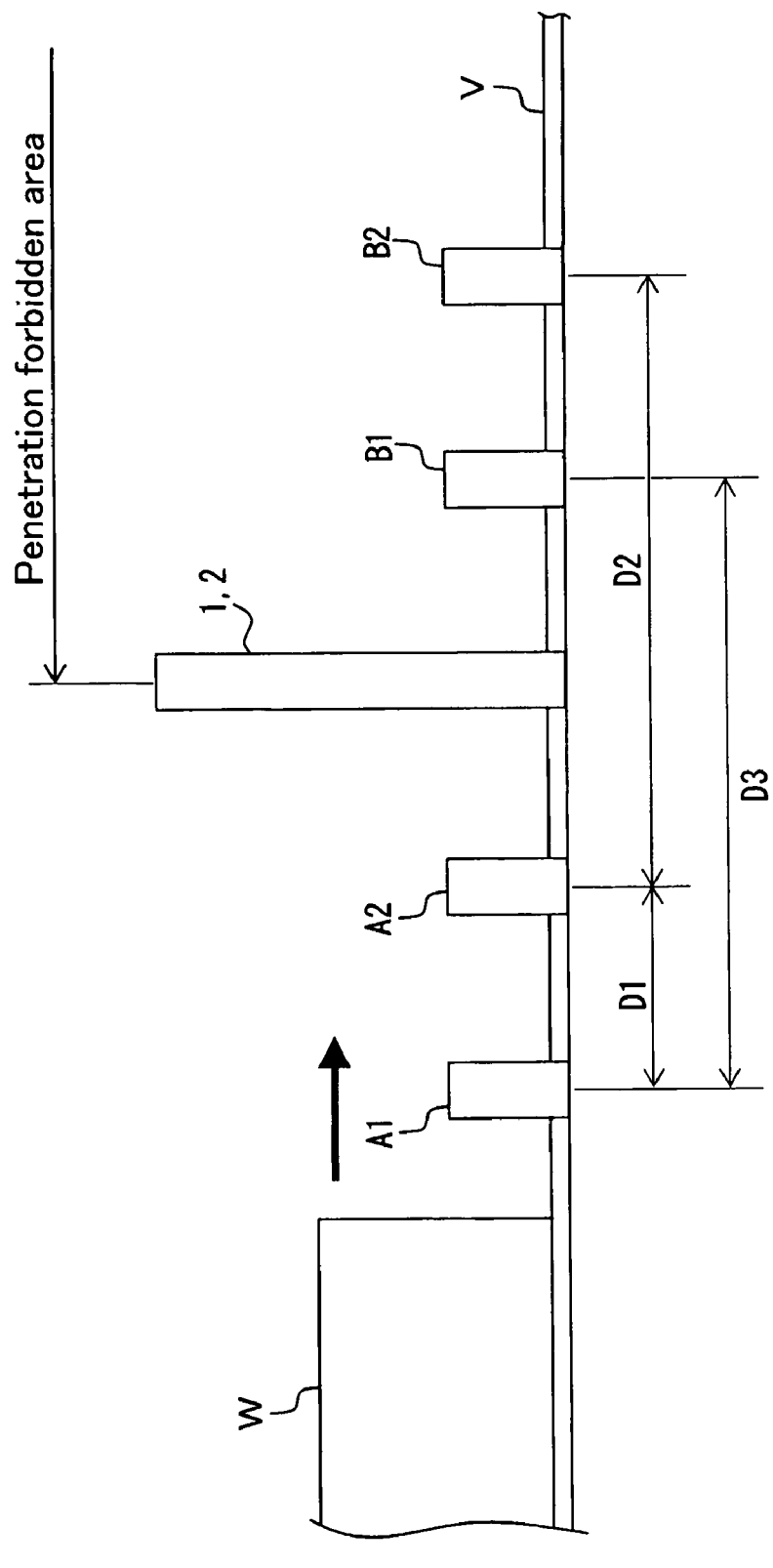
FIG. 1 shows a schematic view illustrating a conveying system including a penetration detecting apparatus in an embodiment according to the present invention.
Figure 9:
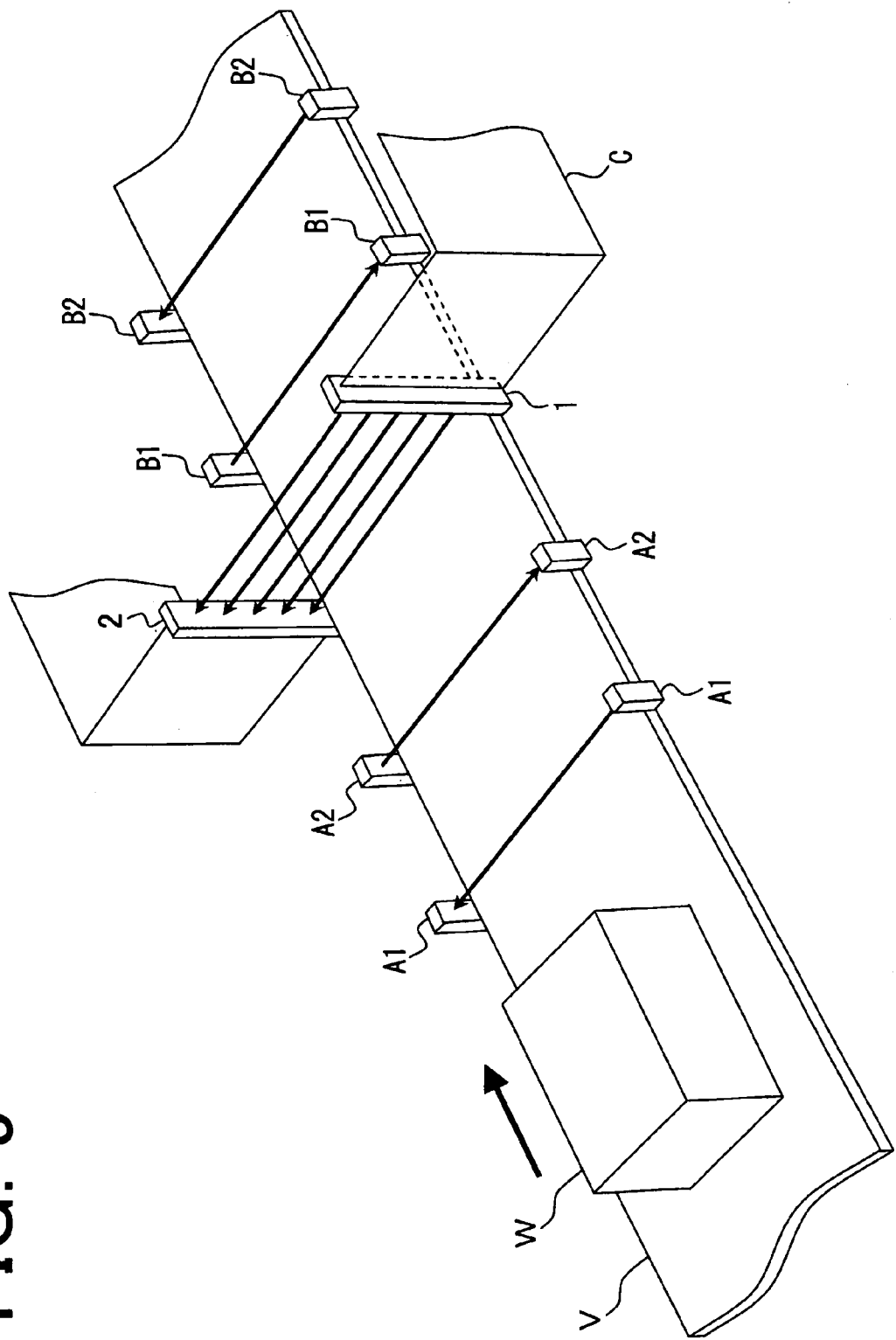
FIG. 9 shows a schematic perspective view illustrating a conveying system including a prior art multi-axis photoelectric sensor.

Referring now to accompanying drawings, and in particular, to FIG. 1, this figure illustrates a conveying system including a penetration detecting apparatus according to an embodiment of the present invention and shows a schematic view from the side of a conveyer V. The conveying system is a similar system to the conveying system as shown in FIG. 9 except for the penetration detecting apparatus. In this embodiment, the muting sensors A1, A2, B1 and B2 are placed at specific positions respectively so as to comply with predetermined requirements. The predetermined requirements are (1) Ta<T=D1/V1<Tb, (2) D2<L1, (3) D3<L1. In this case, an interval between the muting sensor A1 and the muting sensor A2 along the conveying direction is defined as D1, an interval between the muting sensor A2 and the muting sensor B2 is defined as D2, and an interval between the muting sensor A1 and the muting sensor B1 is defined as D3. Further, a moving speed of an object W (a conveying speed), which has a length L1, is defined as V1. Moreover, Ta and Tb are defined as predetermined fixed values.

The requirement (1) requires that a differential time T=D1/V1 from a time when the muting sensor A1 turns to the present detecting status in accordance with the feeding of an object W to a time when the muting sensor A2 turns to the present detecting status, within a predetermined time range. The requirement (2) is provided so as to avoid turning of the muting sensor A2 to the absent detecting status before the muting sensor B2 turns to the present detecting status. The requirement (3) is provided so as to avoid turning of the muting sensor A1 to the absent detecting status before the muting sensor B1 turns to the present detecting status. By locating the muting sensors A1, A2 at the specific positions respectively so as to comply with the requirement (1), distinction between penetration of a target object W and penetration of an object excluding the target object W can be recognized based on the differential time from when the sensor A1 turns to the present detecting status to the time when the sensor A2 turns to the present detecting status. By locating the muting sensors A1, A2, A3 and A4 at the specific positions respectively so as to comply with the requirements (2) and (3), the distinction between the penetration of the target object W and the penetration of the object excluding the target object W can be recognized based on a difference in length between the target object W and the object excluding the target object W along a conveying direction.

Figure 2:
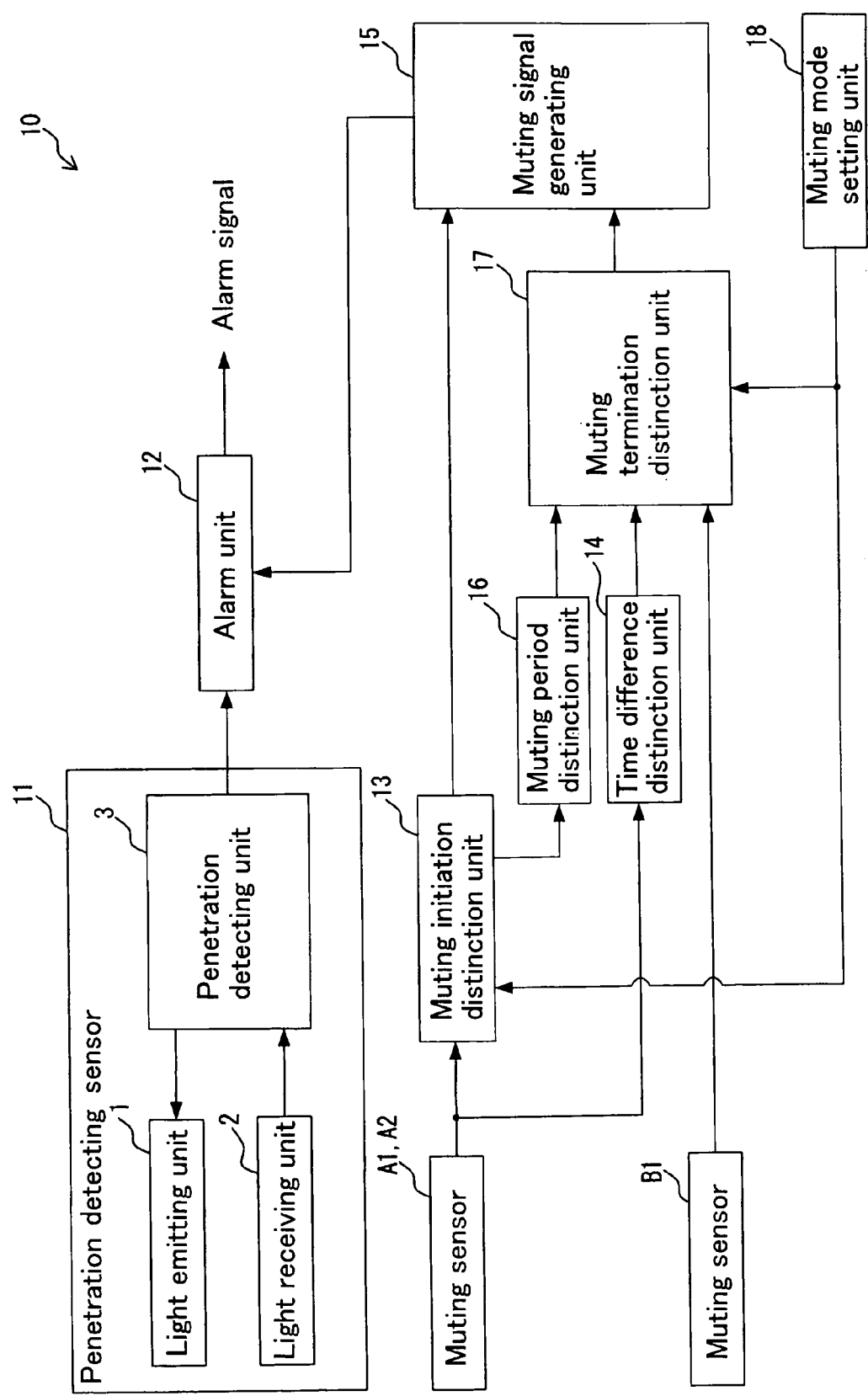
FIG. 2 shows a block diagram illustrating a penetration detecting apparatus 10 in the conveying system as shown in FIG. 1.

FIG. 2 shows a block diagram of a penetration detecting apparatus 10 in the conveying system as shown in FIG. 1. The penetration detecting apparatus 10 comprises a penetration detecting sensor 11 having a light emitting unit 1, a light receiving unit 2 and a penetration detecting unit 3; an alarm unit 12; muting sensors A1, A2; a muting sensor B1; a muting initiation distinction unit 13; a differential time distinction unit 14; a muting signal generating unit 15; a muting period distinction unit 16; a muting termination distinction unit 17 and a muting mode setting unit 18.

The penetration detecting unit 3 detects a penetrating object based on outputting signals of light receiving elements in the light receiving unit 2, and generates a detection signal based on a detection result of the penetrating object thereby. The detection signal shifts from the absent detecting status into the present detecting status in accordance with interruption of the light emitted from the light emitting unit 1. For example, the penetration detecting unit 3 controls the activation of a single light emitting element in the light emitting unit 1 simultaneously, and changes from an activated single light emitting element to an adjacent single light emitting element in the light emitting unit 1 in order to scan a detection area. Then, the penetration detecting unit 3 controls the activation of a single light receiving element associated with the activated single light emitting element in the light receiving unit 2 simultaneously, and receives a detecting signal in accordance with the light receiving amount from the activated single receiving element in order of activating.

The muting initiation distinction unit 13 initiates a muting function based on outputting signals of the muting sensors A1 and A2. The muting period distinction unit 16 distinguishes whether or not a continuous time when the muting function is activated, is in excess of a predetermined period Tc. In more detail, the muting initiation distinction unit 16 determines a continuous time T2 from a time when the muting function is initiated, and distinguishes whether or not the predetermined period Tc passes while the muting function is activated by comparing the continuous time T2 with the predetermined period Tc. In this case, the Tc is a predetermined fixed value.

The muting termination distinction unit 17 terminates the muting function based on either a result distinguished by the muting period distinction unit 16 or signals provided by the muting sensors B1 and B2. For example, the muting termination distinction unit 17 terminates the muting function if at least one of the muting sensors B1 and B2 turns from a present detecting status to an absent detecting status. The muting signal generating unit 15 generates a muting signal representing that a muting function is activated based on both a result distinguished by the muting initiation distinction unit 13 and a result distinguished by the muting termination distinction unit 17 so as to provide the muting signal to the alarm unit 12.

The alarm unit 12 provides an alarm signal based on a detecting signal from the penetration detecting unit 3, except that the muting function is activated. The alarm signal is, for example, utilized as a control signal for stopping the processing machine located in the penetration forbidden area. The alarm unit recognizes whether or not the muting function is activated based on the muting signal provided by the muting signal generating unit 15. When the muting function is activated, the alarm unit 12 does not provide the alarm signal.

The time difference distinction unit 14 watches a differential time T1 from a time when the muting sensor A1 turns to the present detecting status to a time when the muting sensor A2 turns to the present detecting status based on the outputting signals provided from the muting sensors A1 and A2, and distinguishes whether or not the differential time T1 is within a predetermined time range.

The muting mode setting unit 18 sets a muting mode selected from a group of a normal muting mode and a relaxed muting mode both of which have a different requirement for initiating the muting function in accordance with a user input. Further, the muting mode setting unit 18 sets whether or not a time-up function is enabled in accordance with a user input. In this embodiment, the muting mode setting unit 18 includes a user interface for setting the muting mode and the time-up function.

The normal muting mode has the same requirement for initiating the muting function as a muting mode employed in conventional multi-axis photoelectric penetration detecting apparatuses, but has a different requirement for the termination of the muting mode from the conventional multi-axis photoelectric penetration detecting apparatuses. The relaxed muting mode has a relaxed requirement for initiating a muting function than the normal muting mode. During the normal muting mode, where the differential time T1 from the time when the muting senor A1 turns to the present detecting status to the time when the muting sensor A2 turns to the present detecting status, is within a predetermined time range, the muting function is initiated. On the other hand, in case where the differential time T1 is not within the predetermined time range, the muting function is not initiated. In this embodiment, since the predetermined time range is set within positive values, if the muting sensor A1 turns to the present detecting status when the muting sensor A2 is already in the present detecting status, the muting function is not initiated due to the differential time T1 being a negative value.

A termination requirement of the normal muting mode is selectable from either enable or disable of the time-up function for terminating a muting function when the continuous time from a time when the muting function is initiated, is in excess of a predetermined period Tc. When the time-up function is disabling, the muting function is terminated when the muting sensor B1 detects the passage of an object regardless of the continuous time. This indicates that the muting function is not terminated until the sensor B1 turns to the absent detecting status even though the continuous time is in excess of the predetermined period Tc.

During the relaxed muting mode, the muting function is initiated when the muting sensor A2 turns to the present detecting status after the muting sensor A1 turns to the present detecting status. In this case, the muting function is initiated regardless of whether or not the differential time T1 from the time when the muting sensor A1 turns to the present detecting status to the time when the muting sensor A2 turns to the present detecting status, is within the predetermined time range. In this embodiment, since the predetermined time range is set within positive values, if the muting sensors A1 and A2 turn to the present detecting status simultaneously or the muting sensor A1 turns to the present detecting status when the muting sensor A2 is already in the present detecting status, the muting function is not initiated due to the differential time T1 being a negative value.

There are two cases which comply with the requirement of initiating the muting function during the relaxed muting mode. One of the cases is when the muting sensor A2 turns to the present detecting status when the muting sensor A1 is still in the present detecting status after the muting sensor A1 turns to the present detecting status. The other is when the muting sensor A2 turns to the present detecting status when the muting sensor A1 already runs in the absent detecting status after the muting sensor A1 is still to the present detecting status. In this embodiment, the muting function is initiated only when the muting sensor A2 turns to the present detecting status during the muting sensor A1 still runs in the present detecting status after the muting sensor A1 turns to the present detecting status. In other words, during at least part of period when the muting function is activated, a period when the muting sensor A1 runs in the present detecting status and a period when the muting sensor A2 runs in the present detecting status, overlap each other.

A termination requirement of the relaxed muting mode is selectable from either enable or disable of the time-up function for terminating a muting function when the continuous time from a time when the muting function is initiated, is in excess of a predetermined period Tc. When the time-up function is disabled, the muting termination distinction unit 17 determines whether or not the continuous time is considered as the requirement of the termination of the muting function based on a result, which is related to the initiation of the current activated muting, distinguished by the time difference distinction unit 14. In more detail, where the differential time T1 from a time when the muting sensor A1 turns to the present detecting status to a time when the muting sensor A2 turns to the present detecting status, is within a predetermined time range, the muting function is not terminated until the muting sensors B1, B2 detect passage of an object although the continuous time is in excess of the predetermined period Tc. On the other hand, where the differential time T1 is not within the predetermined time range, the muting function is terminated based on either when the sensor B1 detects passage of an object or when the continuous time is in excess of the predetermined period Tc. In other words, during the relaxed muting mode, if the differential time T1 is not within the predetermined time range, the muting function is terminated although the time-up function is deactivated.

Figure 3A:
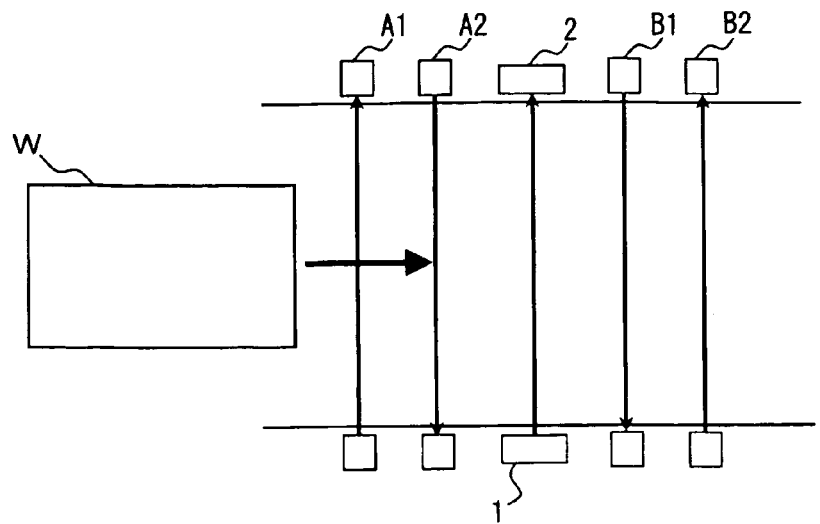
FIG. 3A shows a schematic view illustrating a conveying system with an object W before passage through a penetration detecting sensor 11 along a conveying path.

FIGS. 3A, 3B, 3C, 4A, and 4B show a schematic top view illustrating the penetrating detecting apparatus 10 as shown in FIG. 2 with a target object W so as to describe passage of the object 10 along a conveying direction through the penetration detecting sensor 11. FIG. 3A shows the target object W located in front of a muting sensor A1, i.e. located further upstream than the muting sensor A1 along the conveying direction. In this case, the muting sensors A1, A2, B1 and B2 and the penetration detecting sensor 11 run in the absent detecting status. Thus, where an object excluding the object W passes through the penetration detecting sensor 11, i.e. between the light emitting unit 1 and the light receiving unit 2, the alarm signal is provided.

Figure 3B:
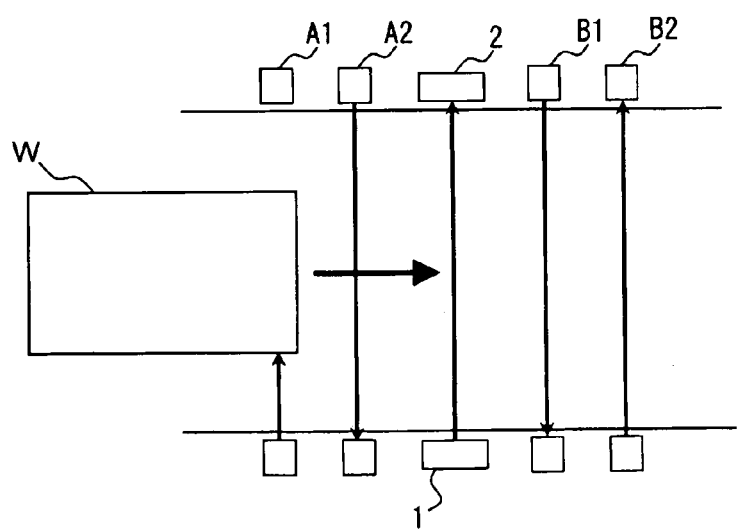
FIG. 3B shows a schematic view illustrating a conveying system with an object W before passage through a penetration detecting sensor 11 along a conveying path.

FIG. 3B shows the target object W located at a first position so that a front end of the target object W is located between the muting sensor A1 and the muting sensor A2, and shows that the target object W interrupts light emitted by the muting sensor. In this case, the only muting sensor A1 runs in the present detecting status.

Figure 3C:
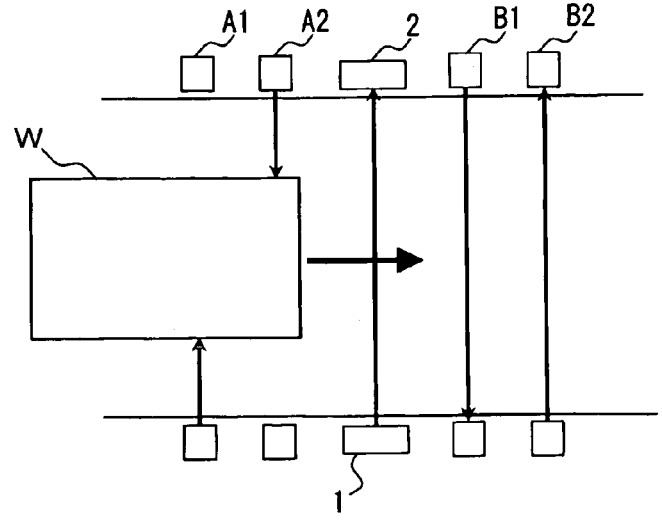
FIG. 3C shows a schematic view illustrating a conveying system with an object W before passage through a penetration detecting sensor 11 along a conveying path.

FIG. 3C shows the target object W located at a second position so that a front end of the target object W is located between the muting sensor A2 and the penetration detecting sensor 11. In this case, both the muting sensor A1 and the muting sensor A2 run in the present detecting status, and the muting function is activated since the muting-sensor A1 and the muting sensor A2 turn to the present detecting status in proper order. Thus, the alarm signal is not provided although the target object W passes through the penetration detecting sensor 11.

Figure 4A:
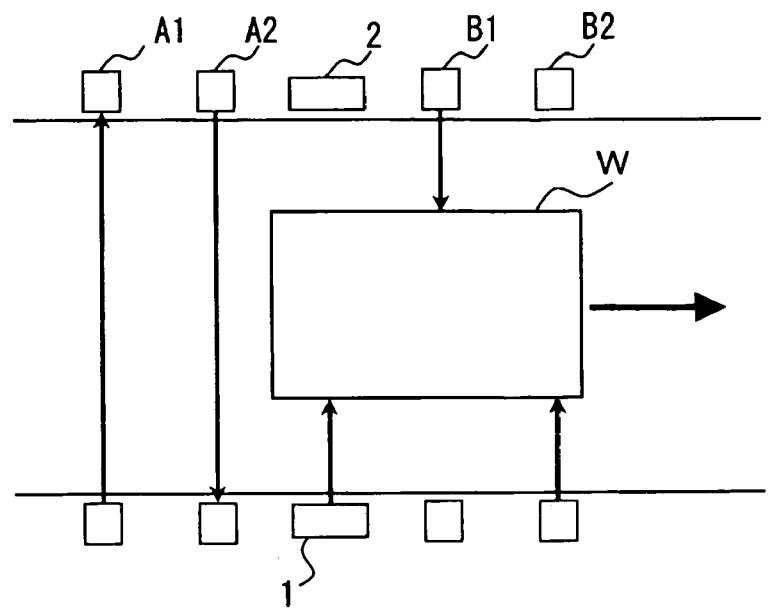
FIG. 4A shows a schematic view illustrating a conveying system with an object W during passage through a penetration detecting sensor 11 along a conveying path.

FIG. 4A shows the target object W located at a third position so that a back end of the target object W is located between the muting sensor A2 and the penetration detecting sensor 11. In this case, since the muting sensors B1, B2 run in the present detecting status, the muting function is still activated. In other words, when at least two muting sensors A1, A2, B1, B2 run in the present detecting status, the muting function continues to be activated.

Figure 4B:
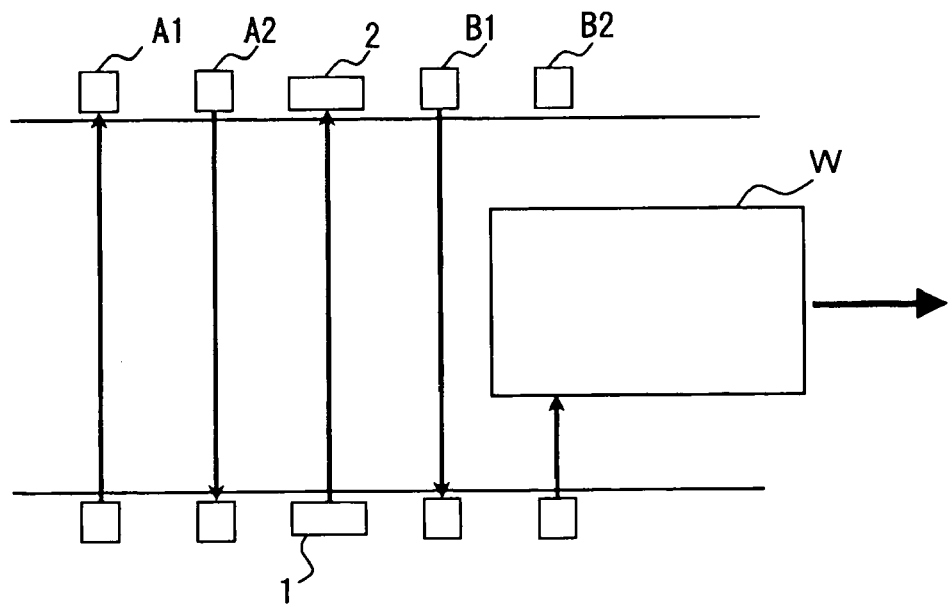
FIG. 4B shows a schematic view illustrating a conveying system with an object W during passage of the object W through a penetration detecting sensor 11 along a conveying path.

FIG. 4B shows the target object W located at a fourth position so that a back end of the target object W is located between the muting sensor B1 and the muting sensor B2. In this case, since the muting sensor B1 turns to the absent detecting status and the only muting sensor B2 runs in the present detecting status, passage of the target object W through between the light emitting unit 1 and the light receiving unit 2, is detected. Thus, the muting function is terminated.

FIG. 5 shows time chart associated with the penetration detecting apparatus 10 as shown in FIG. 2 when the target object W passes through the penetration detecting sensor 11 along the conveying path. In this embodiment, signals of the muting sensors A1, A2, B1 and B2 represent a high level at the present detecting status and a low level at the absent detecting status. And the present detecting status is defined as an ON state and the absent detecting status is defined as an OFF state on the muting sensors A1, A2, B1 and B2. The muting signal which represents a muting status and is provided to the alarm unit 12, is defined as the high level when the muting function is activated and the low level during the muting function is deactivated. The detecting signal of the penetration detecting sensor 11 is defined as the high level when the absent detecting status (light receiving status) and as the low level when the present detecting status (light interrupted). The alarm signal turns to the high level when the penetration sensor 11 turns to the present detecting status when the muting function is deactivated.

In this case, since the muting sensors A1, A2, B1 and B2 are positioned in order, when the target object W passes through between the light emitting unit 1 and the light receiving unit 2 along the conveying path, the muting sensors A1, A2, B1 and B2 turn to the present detecting status in the order of the positions.

During the normal muting mode, where the differential time T1 is within a predetermined time range, the muting signal switches to the high level in synchronization with the increase of an outputting signal of the muting sensor A2. Then, the muting function is initiated.

On the other hand, during the relaxed muting mode, where the muting sensor A2 turns to the present detecting status after the muting sensor A1 turns to the present detecting status, the muting function is initiated although the differential time is not within the predetermined time range.

During both the normal and the relaxed muting mode, the muting signal stays at the high level, and the alarm signal stays at the low level although the penetration detecting sensor 11 turns to the present detecting status.

The muting sensors A1, A2, B1 and B2 turn to the absent detecting status in order of positions. In the sequence, the muting signal switches to the low level in synchronization with the lowering of an outputting signal of the muting sensor B1 since the muting function is terminated.

In this embodiment as shown in FIG. 5, a continuous time T2 when the muting function is activated, is less than a predetermined period Tc, so the muting function is terminated based on the muting sensor B1 turning to the absent detecting status. For example, when the time-up function is set to be enabling and the continuous time is in excess of the predetermined period Tc, the muting function is terminated based on the continuous time although the muting sensor B1 does not turn to the absent detecting status.

When the muting function is not activated, the muting signal stays at the low level, and the alarm signal turns to the high level when the penetration detecting sensor 11 turns to the present detecting status.

Figure 6:
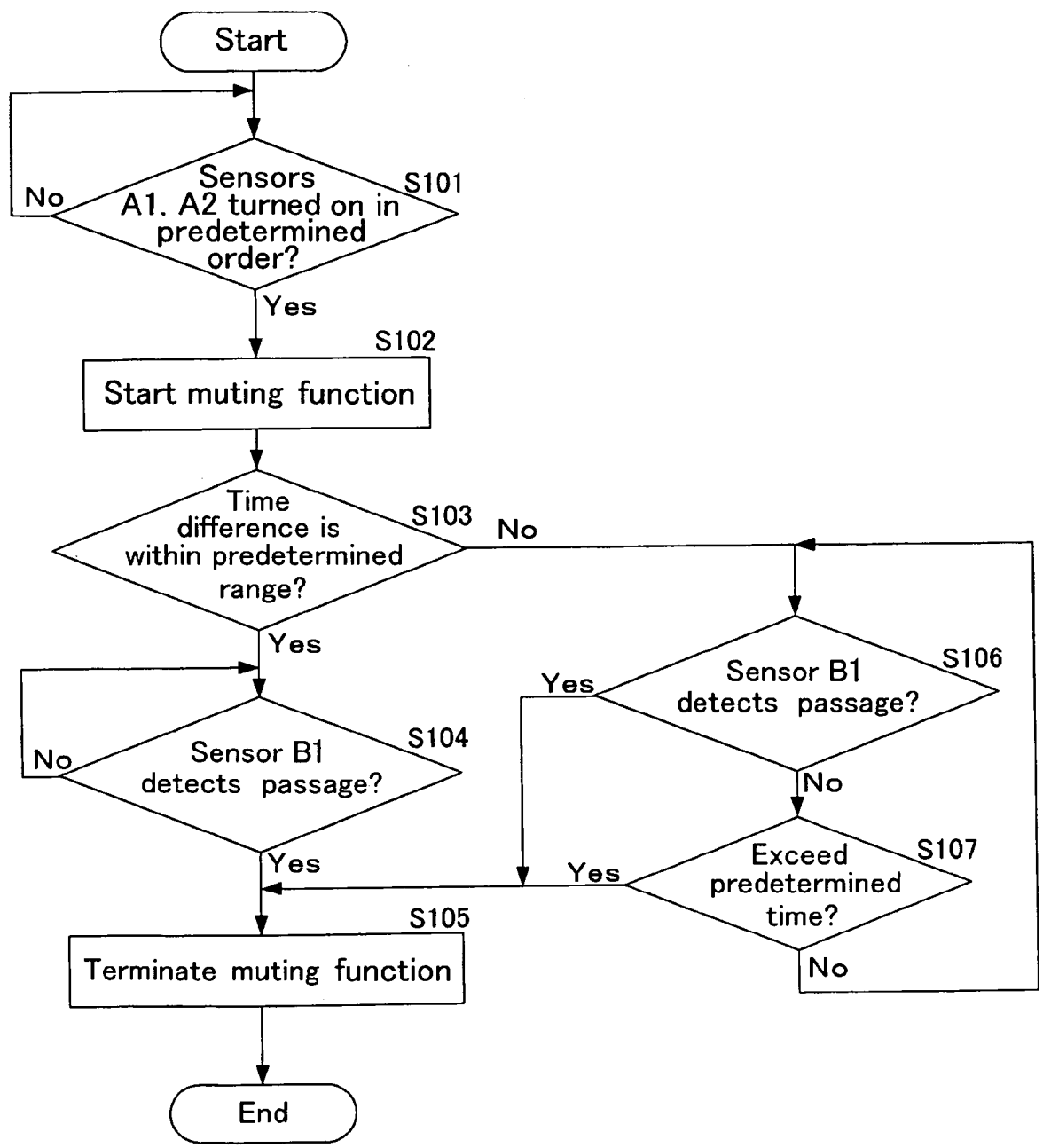
FIG. 6 is a flowchart showing a sequence of activating and deactivating of a muting function.

FIG. 6 shows a flowchart associated with process during the relaxed muting mode, especially in the case where the time-up function is disabling.

The muting initiation distinction unit 13 distinguishes whether or not the muting sensors A1 and A2 are turned to the present detecting status in proper order based on the outputting signals from the muting sensors A1 and A2, and initiates the muting function when the muting initiation distinction unit 13 distinguishes that the muting sensors A1 and A2 are turned to the present detecting status in the proper order (Steps S101 and S102).

The muting termination distinction unit 17 which determines whether or not the continuous time during the muting function is activated, is considered a requirement for the termination of the muting function based on a result distinguished by the time differential distinction unit 14 (Step S103).

In the case where the differential time T1 meets within the predetermined time range, the muting function is terminated based on the detection result of the muting sensor B1 (Steps S104 an S105). In more detail, the muting function is terminated based on a passage detection of an target object by the muting sensor B1, but the muting function is not terminated until the muting sensor B1 detects the passage of the target object even though the continuous time is in excess of the predetermined period Tc.

On the other hand, in the case where the differential time T1 does not meet within the predetermined time range, the muting function is terminated at an earlier time when the muting sensor B1 detects passage of the target object and time when the continuous time is excess of the predetermined period Tc (Steps S106 and S107).

In this embodiment, the muting function is initiated when the muting sensor A2 turns to the present detecting status after the muting sensor A1 turns to the present detecting status. Thus, even if a front end of an object W is located at a position between the muting sensor A1 and the muting sensor A2 in order to, for example, wait to be processed since the processing machines are placed side by side in short range along a conveyer line, the muting function can be activated. Moreover, in the case where the differential time T1 from the time when the muting sensor A1 turns to the present detecting status to the time when the muting sensor A2 turns to the present detecting status, meets within the predetermined time range, the muting function is not terminated although the continuous time is in excess of the predetermined period Tc. Besides, in the case where the differential time T1 does not meet within the predetermined time range, the muting function is terminated when the continuous time is in excess of the predetermined period Tc. Thus, when the muting sensor A1 and the muting sensor A2 have failed accidentally, the penetration detecting apparatus 10 can avoid an unintentional continuation of the muting function.

In this embodiment, although four photoelectric sensors are utilized as a muting sensor, nevertheless, the present invention is not limited to this embodiment. For example, both an initiation distinction of the muting function and a passage detection of an object through the penetration detecting sensor 11, can be performed utilizing two or more photoelectric sensors.

Figure 7:
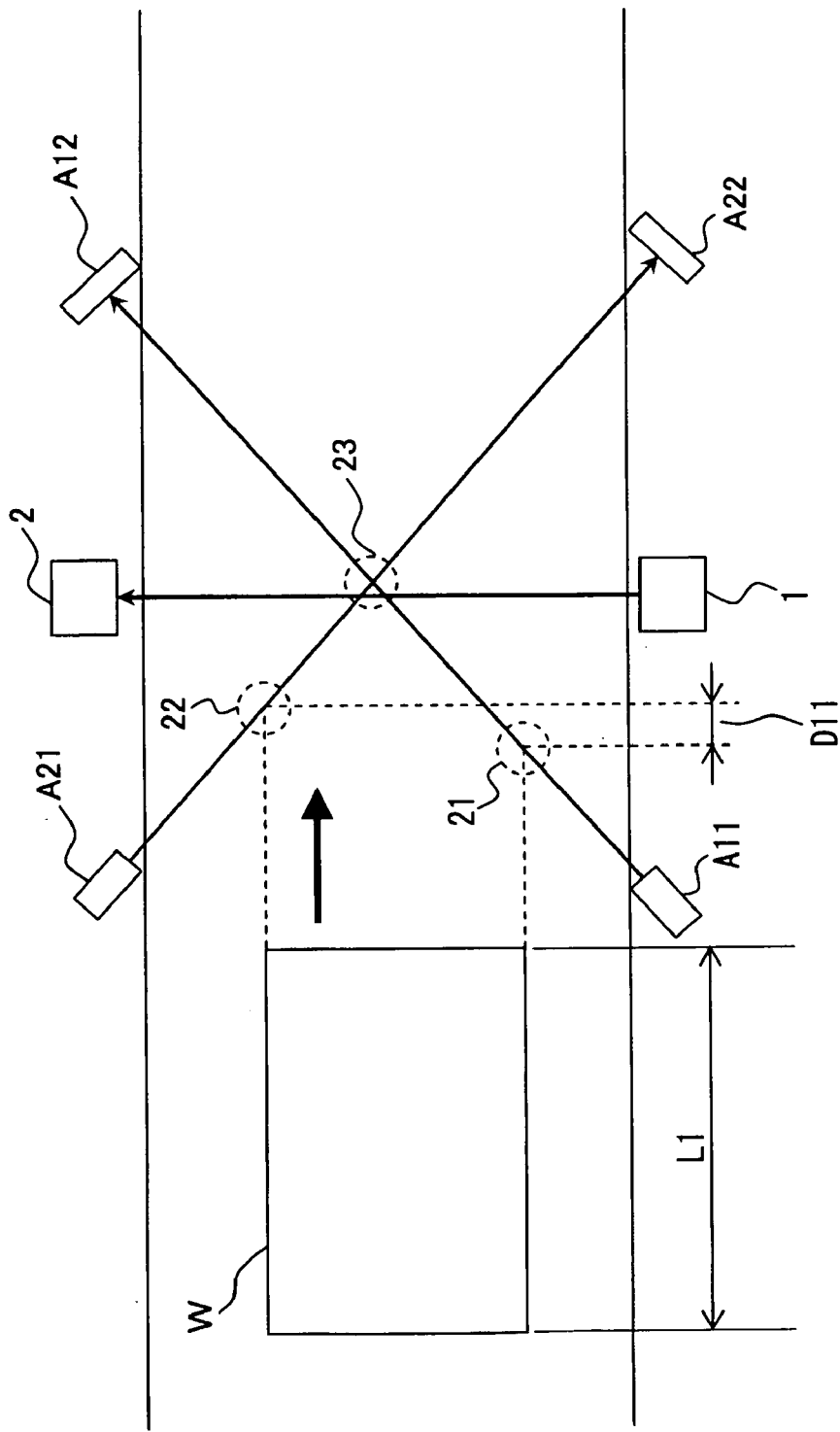
FIG. 7 shows a schematic view illustrating a conveying system in another embodiment.

FIG. 7 shows a schematic top view illustrating a penetration apparatus with muting sensors according to another embodiment of the present invention. A muting function for the penetration detecting apparatus is established by using two muting sensors A11 and A21. The muting sensor A11 includes both a light emitter and a light receiver. The light emitter of the muting sensor A11 irradiates light to a reflector A12, and the light receiver of the muting sensor A11 receives the reflected light from the reflector A12. The muting sensor A11 is so-called a retro-reflective photoelectric sensor. The muting sensor A21 irradiates light to a reflector A22, and receives the light reflected on the reflector A22.

In this embodiment, since the muting sensors A11 and A21 ate located more upstream than a penetration detecting sensor, the reflectors A12 and A22 are located more downstream than the penetration detecting sensor so as to utilize the muting sensors A11 and A21 as a passage sensor. The muting sensor A11 and the reflector A12 ate disposed at opposite sides of a conveyer V respectively. In the same manner, the muting sensor A21 and the reflector A22 are disposed at the opposite sides of the conveyer V respectively. Moreover, the muting sensors A11 and A21 are located so that optical axes of the muting sensors A11 and A21 are crossed at a position 23 in a penetration forbidden area. In other words, the optical axes of the muting sensors A11 and A21 are crossed slightly of downstream the penetration detecting sensor. The position 23 is located at an offset position from a center of the conveyer V along a perpendicular direction to the conveying direction.

When an object W is fed along a conveying path, a front end of the object W located at a position 21 interrupts light irradiated from the muting sensor A11. So the muting sensor A11 turns to the present detecting status. Then, a front end of the object W located at a position 22 interrupts light irradiated from the muting sensor A21. So the muting sensor A21 turns to the present detecting status. The position 21 and the position 22 are located at upper positions than the penetration detecting sensor, and the position 21 is located upstream of the position 22. An interval D11 between the position 21 and the position 22 comply with a requirement D11<L1. In this case, the muting sensors A11 and A21 are located so that differential time T10=D11/V1 meets within a predetermined time range.

During a normal muting mode, the muting function is initiated when a differential time, which is from the time when the muting sensor A11 turns to the present detecting status to the time when the muting sensor A21 turns to the present detecting status, meets within the predetermined time range.

On the other hand, during a relaxed muting mode, the muting function is initiated when the muting sensor A21 turns to the present detecting status although the differential time does not meet within the predetermined time range.

After the object W passes through the penetration detecting sensor, since a back end of the object W moves away from an optical axis of the muting sensor A11, the muting sensor A11 turns to the absent detecting status. The muting sensor A11 also plays a role of a passage sensor for detecting passage of the object W through the penetration detecting sensor.

In such the manner, the penetration detecting apparatus having the muting function which is applicable for various kinds of applications can be provided.

In this embodiment, although the penetration detecting sensor is placed on the conveying line for feeding the target object W and the muting sensors are located upstream and downstream of the penetration detecting sensor along the conveying direction, nevertheless, the present invention is not limited to this embodiment. For example, the present invention is applicable for cases where activating the muting function is based upon the motion of a processing machine, such as a pressing machine.

Figure 8:
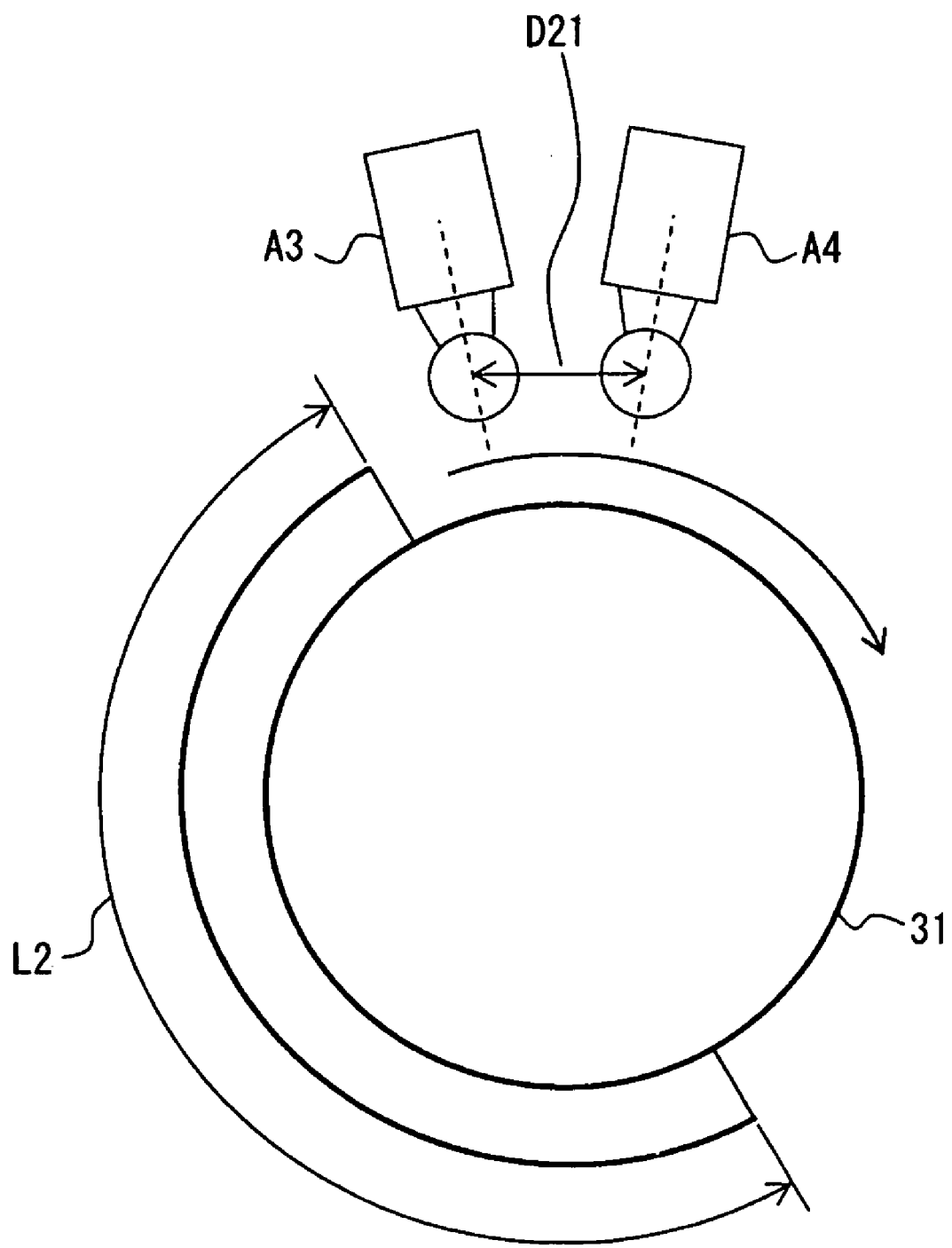
FIG. 8 shows a schematic view illustrating a processing system in an embodiment according to the present invention.

FIG. 8 shows a schematic view illustrating a processing machine with muting sensors A3 and A4. In a pressing machine which can be one of the processing machines, a mold repeatedly operates by approaching an object W (not shown) and stepping away from the object W. In this case, muting sensors A3 and A4 are a contact sensors and are disposed around a cam which rotates in cooperation with the operation of the mold in the pressing machine. When the mold is stepping away from the object W, the cam 31 pushes up the probes of the contact muting sensors A3 and A4. The contact muting sensors A3 and A4 turn to the present detecting status. On the other hand, when the mold is approaching the object W, the cam 31 does not push up the probes of the contact muting sensors A3 and A4. The contact muting sensors A3 and A4 turn to the absent detecting status.

An interval between the muting sensor A3 and the muting sensor A4 along a rotating direction of the cam 31 is defined as D21, and a rotating speed of the cam 31 is defined as V2. The muting sensors A3 and A4 are disposed so as to comply with (1) Ta<D21/V2<Tb, (2) D21<L2 (L2: a length of the cam 31 along a circumferential direction corresponding to the absent detecting status of the muting sensor).

In this embodiment, although the multi-axis photoelectric sensor is utilized as the penetration detecting sensor 11 and an object is detected at a two-dimensional area formed between the light emitting unit 1 and the light receiving unit 2, nevertheless, the present invention is not limited to this embodiment. For example, a photoelectric sensor having a light emitting unit and a light receiving unit, is utilized as a muting sensor, and an object can be detected at a one-dimensional area or three-dimensional area formed by the light emitting unit and the light receiving unit.

In the embodiments, although the photoelectric sensors or the contact sensors are utilized as the muting sensor, nevertheless, the present invention is not limited to the embodiments. For example, a radio wave sensor, a sound wave sensor, an ultrasonic sensor and the like can be used as the muting sensor.

The invention claimed is:

1. A penetration detecting apparatus having a muting function, comprising:
   a penetration detecting sensor for performing a detection of an object at a predetermined detection area;
   an alarm means for providing an alarm signal based on a result of the detection performed by the penetration detection sensor when the muting function is not activated;
   a signal receiver for receiving a first detection signal representing either a detection status or an absent detecting status of the object from a first sensor and a second detection signal representing either a detection status or an absent detecting status of the object from a second sensor;
   a muting starter for activating the muting function at a time of shifting of the second detection signal from the absent detecting status to the detection status after the first detection signal is shifted from the absent detecting status to the detection status;
   a muting timer for performing a comparison of continuous time when the muting function is activated within a predetermined period;

a time differential watcher for recognizing a differential time between a time of shifting of the first detection signal from the absent detecting status to the detection status and the time of shifting of the second detection signal from the absent detecting status to the detection status, and for determining whether the differential time is within a predetermined criterion; and a muting terminator for terminating the activated muting function based on the comparison performed by the muting timer and a signal representing a passage of the object provided from a passage sensor when the differential time is not within the predetermined criterion, and for terminating the activated muting function based on a signal representing the passage of the object provided from the passage sensor when the differential time is within the predetermined criterion.

2. The penetration detecting apparatus defined in claim 1, wherein the first sensor and second sensor are utilized as the passage sensor.

3. The penetration detecting apparatus defined in claim 1, wherein the penetration detecting sensor comprises a plurality of light emitters and a plurality of light receivers configuring to being a plurality of light beams in a predetermined detection area, and the penetration detecting sensor detects an interception of the beam as the detection of the object.

4. The penetration detecting apparatus defined in claim 1, the penetration detecting apparatus further comprising a selector configured to selecting either enable or disable of the terminating of a muting function caused by an excess of continuous time over the predetermined period.

5. The penetration detecting apparatus defined in claim 1, wherein each sensor of the first sensor and second sensor has a single beam.

6. A light curtain having a muting function, comprising:
a plurality of light emitters and a plurality of light receivers configuring to being a plurality of light beams in a predetermined detection area;
an evaluation unit coupled to the light receiver, configuring to detecting an interception of the beam,
an alarm output configuring to providing an alarm signal based on the interception of beam detected by the evaluation unit when the muting function is not activated;
a signal receiver being capable of receiving a first detection signal representing either a detection status or an absent detecting status of an object from a first sensor and a second detection signal representing either a detection status or an absent detecting status of the object from a second sensor; and
wherein the evaluation unit activates the muting function in response to shifting of the second detection signal from the absent detecting status to the detection status after the first detection signal is shifted from the absent detecting status to the detection status; recognizes a differential time between a time of shifting of the first detection signal from the absent detecting status to the detection status and the time of shifting of the second detection signal from the absent detecting status to the detection status, and for determining whether the differential time is within a predetermined criterion; and (i) terminates the activated muting function based on a signal representing the passage of the object provided from the passage sensor when the differential time is within the predetermined criterion, and (ii) terminates the activated muting function based on either (a) a signal representing a passage of the object provided from a passage sensor or (b) an excess of a continuous time of the activated muting function over a predetermined period when the differential time is not within the predetermined criterion.

7. The light curtain defined in claim 6, wherein the first sensor and second sensor are utilized as the passage sensor.

8. The light curtain defined in claim 6, the penetration detecting apparatus further comprising a selector configured to selecting either enable or disable of the terminating of a muting function caused by an excess of continuous time over the predetermined period.

9. The light curtain defined in claim 6, wherein each sensor of the first sensor and second sensor has a single beam.

10. A method for muting an alarm of a penetration detecting apparatus having a muting function, the method comprising:
detecting an object in a predetermined detection area;
providing an alarm signal in response to the detecting of the object when the muting function is not activated;
receiving a first detection signal representing either a detection status or an absent detecting status of the object from a first sensor and a second detection signal representing either a detection status or an absent detecting status of the object from a second sensor;
activating the muting function in response to shifting of the second detection signal from the absent detecting status to the detection status after the first detection signal is shifted from the absent detecting status to the detection status;
recognizing a differential time between a time of shifting of the first detection signal from the absent detecting status to the detection status and the time of shifting of the second detection signal from the absent detecting status to the detection status, and for determining whether the differential time is within a predetermined criterion; and
terminating the activated muting function based on a signal representing a passage of the object provided from a passage sensor when the differential time is within the predetermined criterion, and terminating the activated muting function based on either (a) a signal representing the passage of the object provided from the passage sensor or (b) an excess of a continuous time of the activated muting function over a predetermined period when the differential time is not within the predetermined criterion.

* * * * *